United States Patent
Fujishiro et al.

(10) Patent No.: US 11,617,209 B2
(45) Date of Patent: Mar. 28, 2023

(54) TIMER CONTROL IN EARLY DATA TRANSMISSION

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 213 days.

(21) Appl. No.: 17/034,212

(22) Filed: Sep. 28, 2020

(65) Prior Publication Data
US 2021/0022185 A1 Jan. 21, 2021

Related U.S. Application Data

(63) Continuation of application No. PCT/JP2019/015033, filed on Apr. 4, 2019.

(60) Provisional application No. 62/652,429, filed on Apr. 4, 2018.

(51) Int. Cl.
- H04W 4/00 (2018.01)
- H04W 74/08 (2009.01)
- H04W 36/00 (2009.01)

(52) U.S. Cl.
CPC ... H04W 74/0833 (2013.01); H04W 36/0055 (2013.01)

(58) Field of Classification Search
CPC ......... H04W 74/0833; H04W 36/0055; H04W 48/20
USPC .................................. 370/329–330, 335–345
See application file for complete search history.

(56) References Cited

U.S. PATENT DOCUMENTS

| | | | |
|---|---|---|---|
| 10,701,655 B1* | 6/2020 | Shih | H04W 74/0833 |
| 2016/0227582 A1* | 8/2016 | Vajapeyam | H04W 4/70 |
| 2016/0295609 A1* | 10/2016 | Vajapeyam | H04W 74/0833 |

FOREIGN PATENT DOCUMENTS

| | | | | |
|---|---|---|---|---|
| AU | 2015252029 A1 | * | 11/2015 | |
| CN | 103945383 A | * | 7/2014 | |
| CN | 103874147 B | * | 1/2018 | |
| CN | 110999404 A | * | 4/2020 | H04W 4/70 |
| WO | WO-2014021611 A1 | * | 2/2014 | H04W 36/0055 |
| WO | WO-2021027821 A | * | 2/2021 | H04W 74/0833 |
| WO | WO-2021231578 A1 | * | 11/2021 | H04W 76/27 |
| WO | WO-2021257856 A1 | * | 12/2021 | |

OTHER PUBLICATIONS

Huawei, Hisilicon, Qualcomm Incorporated; "Introduction of EDT for eMTC and NB-IoT enhancements"; 3GPP TSG-RAN2 Meeting #101; R2-1803443; Feb. 26-Mar. 2, 2018; total 17 pages; Athens, Greece.

\* cited by examiner

*Primary Examiner* — Thai D Hoang
(74) *Attorney, Agent, or Firm* — Studebaker & Brackett PC

(57) ABSTRACT

A method according to one embodiment is used in a user equipment configured to perform early data transmission in which uplink data is transmitted during random access procedure. The method comprises starting a timer that determines a holding time of parameters used for cell reselection operation; receiving an Early Data Complete message used to confirm successful completion of the early data transmission, after the random access procedure has started; stopping the timer in response to receiving the Early Data Complete message; and starting the timer in response to the Early Data Complete message including the parameters used for cell reselection operation.

3 Claims, 8 Drawing Sheets

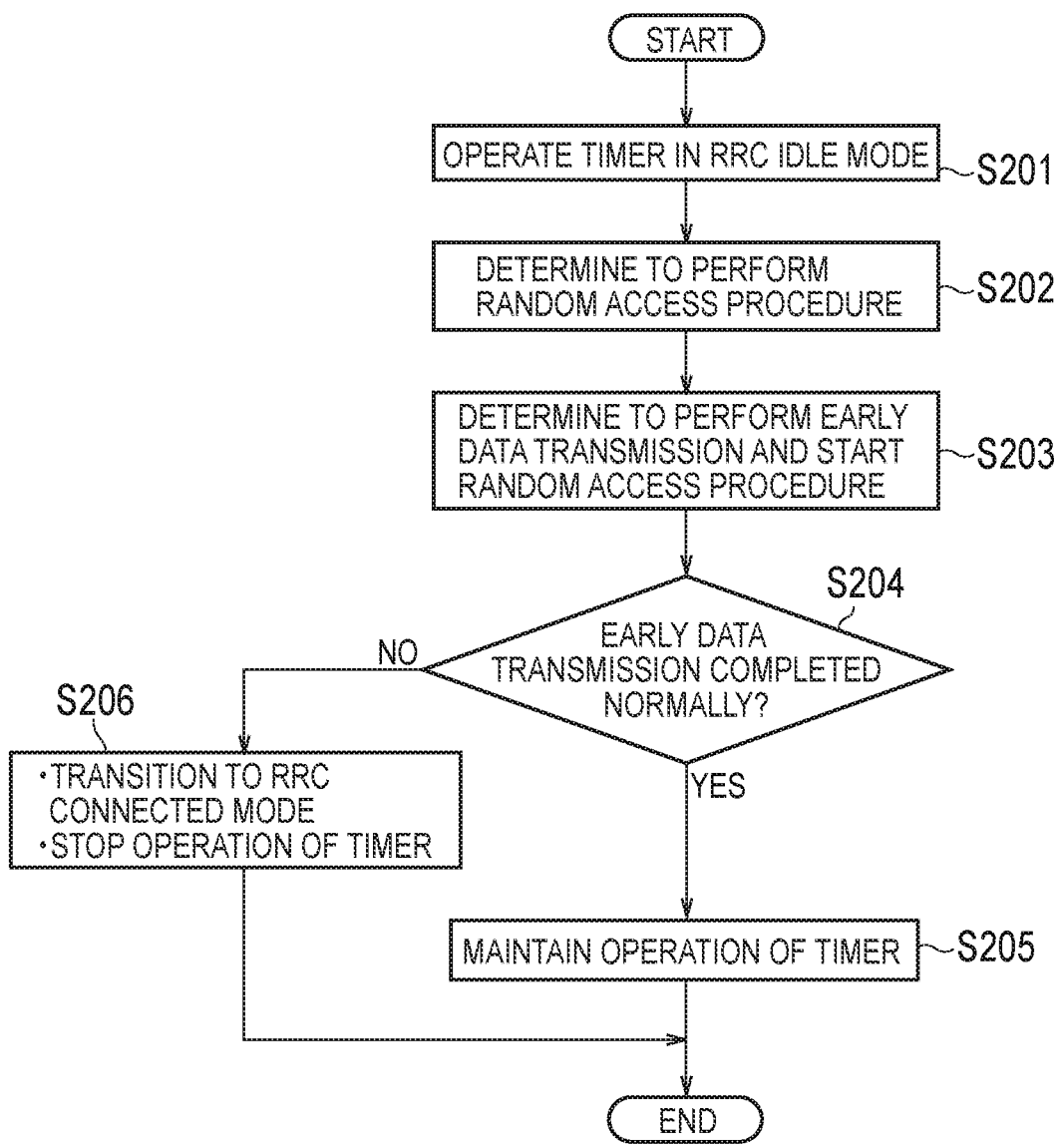

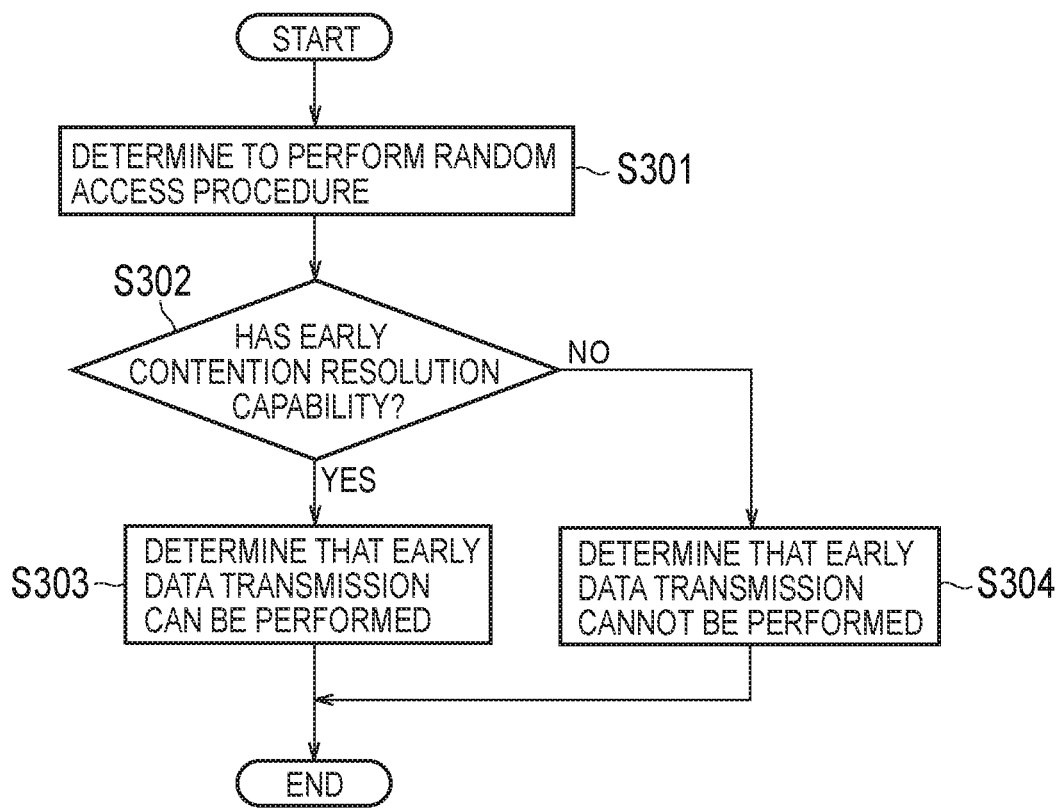

US 11,617,209 B2

TIMER CONTROL IN EARLY DATA TRANSMISSION

RELATED APPLICATIONS

The present application is a continuation based on PCT Application No. PCT/JP2019/015033, filed on Apr. 4, 2019, which claims the benefit of U.S. Provisional Application No. 62/652,429 (filed on Apr. 4, 2018). The content of which is incorporated by reference herein in their entirety.

TECHNICAL FIELD

The present invention relates to a communication control method in a mobile communication system.

BACKGROUND ART

In recent years, radio terminals targeting machine type communication (MTC) and Internet of Things (IoT) services that perform communication without human intervention have attracted attention. Such a radio terminal is required to realize cost reduction, coverage expansion, and low power consumption. For this reason, in 3rd generation partnership project (3GPP), a category of a new radio terminal whose transmission/reception bandwidth is limited to only a part of the system transmission/reception bandwidth is specified.

A radio terminal for MTC or IoT transmits/receives a small amount of data and the frequency of the transmission/reception is low, compared with general radio terminals. In view of this, early data transmission has been under study for enabling radio terminals for MTC and IoT to communicate efficiently. With this technique, user data is transmitted using a predetermined message during a random access procedure.

Unfortunately, the current mobile communication systems do not assume the user data to be transmitted during the random access procedure, meaning that there is no mechanism enabling implementation of the early data transmission.

SUMMARY

A method according to one embodiment is used in a user equipment configured to perform early data transmission in which uplink data is transmitted during random access procedure. The method comprises starting a timer that determines a holding time of parameters used for cell reselection operation; receiving an Early Data Complete message used to confirm successful completion of the early data transmission, after the random access procedure has started; stopping the timer in response to receiving the Early Data Complete message; and starting the timer in response to the Early Data Complete message including the parameters used for cell reselection operation.

A user equipment according to one embodiment is configured to perform early data transmission in which uplink data is transmitted during random access procedure. The user equipment comprises a processor and a memory, the processor configured to: start a timer that determines a holding time of parameters used for cell reselection operation; receive an Early Data Complete message used to confirm successful completion of the early data transmission, after the random access procedure has started; stop the timer in response to receiving the Early Data Complete message; and start the timer in response to the Early Data Complete message including the parameters used for cell reselection operation.

An apparatus according to one embodiment is used for controlling a user equipment configured to perform early data transmission in which uplink data is transmitted during random access procedure. The apparatus comprises a processor and a memory, the processor configured to: start a timer that determines a holding time of parameters used for cell reselection operation; receive an Early Data Complete message used to confirm successful completion of the early data transmission, after the random access procedure has started; stop the timer in response to receiving the Early Data Complete message; and start the timer in response to the Early Data Complete message including the parameters used for cell reselection operation.

BRIEF DESCRIPTION OF DRAWINGS

FIG. 9 is a diagram illustrating an example of an operation regarding the timer for the RRC idle mode according to an embodiment.

FIG. 10 is a diagram illustrating an example of an operation regarding the early contention resolution capability of the NB-IoT UE according to an embodiment.

DESCRIPTION OF EMBODIMENTS (Mobile Communication System)

Figure 1:
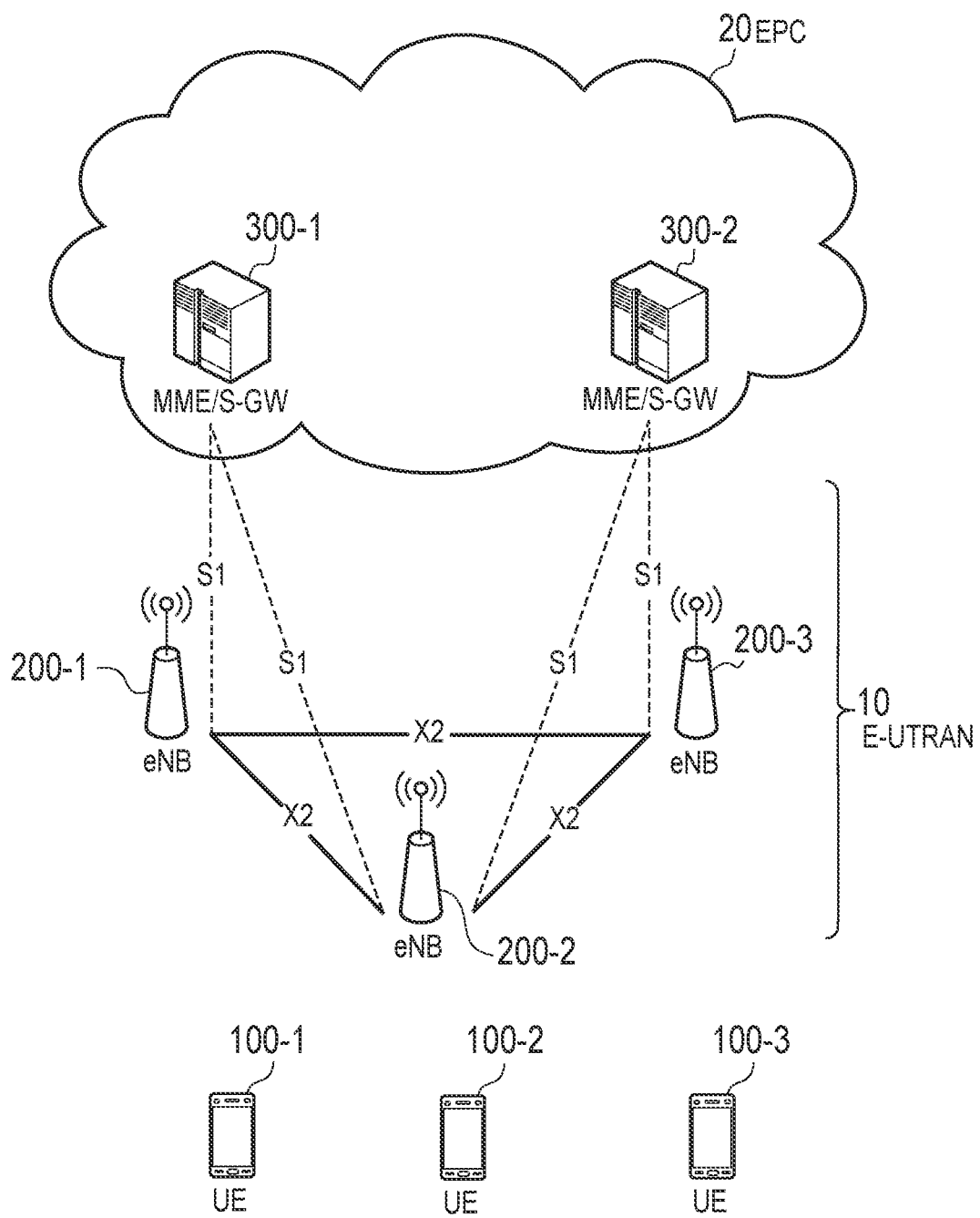
FIG. 1 is a diagram illustrating a configuration of the LTE system (mobile communication system) according to an embodiment.

A configuration of a mobile communication system according to the present embodiment will be described. FIG. 1 is a diagram illustrating a configuration of a long term evolution (LTE) system that is a mobile communication system according to the present embodiment. The LTE system is a mobile communication system based on the 3GPP standard.

The LTE system includes a radio terminal (UE: user equipment) 100, a radio access network (E-UTRAN: evolved-UMTS terrestrial radio access network) 10, and a core network (EPC: evolved packet core) 20.

The UE 100 is a mobile communication device. The UE 100 performs radio communication with an eNB 200 that manages a cell (serving cell) in which the UE 100 exists.

An E-UTRAN 10 includes a base station (eNB: evolved Node-B) 200. The eNBs 200 are connected to each other via an X2 interface. The eNB 200 manages one or a plurality of cells. The eNB 200 performs radio communication with the UE 100 which sets up the connection with a cell of the eNB 200. The eNB 200 has a radio resource management (RRM)

function, a routing function of user data (hereinafter, sometimes referred to as "data"), a measurement control function for mobility control and scheduling, and the like. The "cell" is used as a term indicating a smallest unit of a radio communication area. The "cell" may also be used as a term indicating a function of performing the radio communication with the UE 100 or a resource. One cell belongs to one carrier frequency.

The EPC 20 includes mobility management entity (MME) and a serving gateway (S-GW) 300. The MME performs various mobility controls and the like on the UE 100. The MME manages information on a tracking area (TA) in which the UE 100 exists by communicating with the UE 100 using non-access stratum (NAS) signaling. The tracking area is an area composed of a plurality of cells. The S-GW performs data transfer control. The MME and the S-GW are connected to the eNB 200 via an S1 interface.

Figure 2:
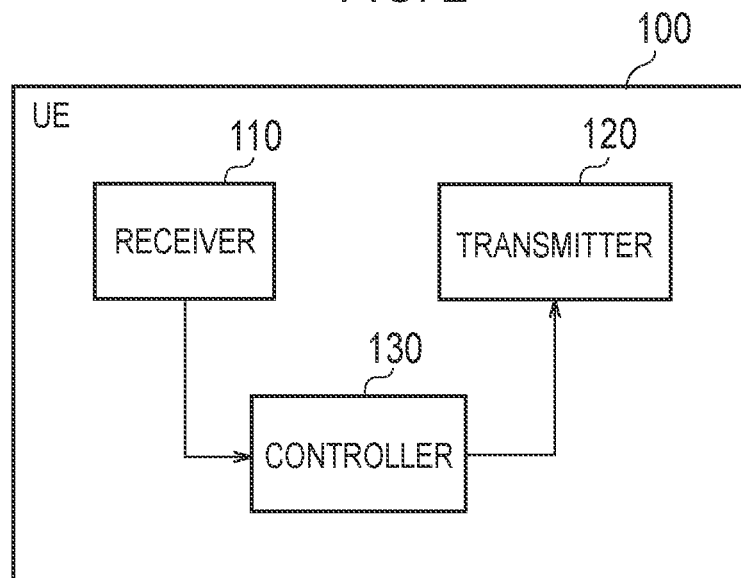
FIG. 2 is a diagram illustrating a configuration of a UE (radio terminal) according to the embodiment.

FIG. 2 is a diagram illustrating a configuration of the UE 100 (radio terminal). The UE 100 includes a receiver 110, a transmitter 120, and a controller 130.

The receiver 110 performs various receptions under the control of the controller 130. The receiver 110 includes an antenna and a receiving device. The receiving device converts a radio signal received by the antenna into a baseband signal (received signal) and outputs the baseband signal to the controller 130.

The transmitter 120 performs a variety of transmission under the control of the controller 130. The transmitter 120 includes an antenna and a transmitting device. The transmitting device converts the baseband signal (transmitted signal) output from the controller 130 into the radio signal and transmits the radio signal from the antenna.

The controller 130 performs various controls in the UE 100. The controller 130 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

Figure 3:
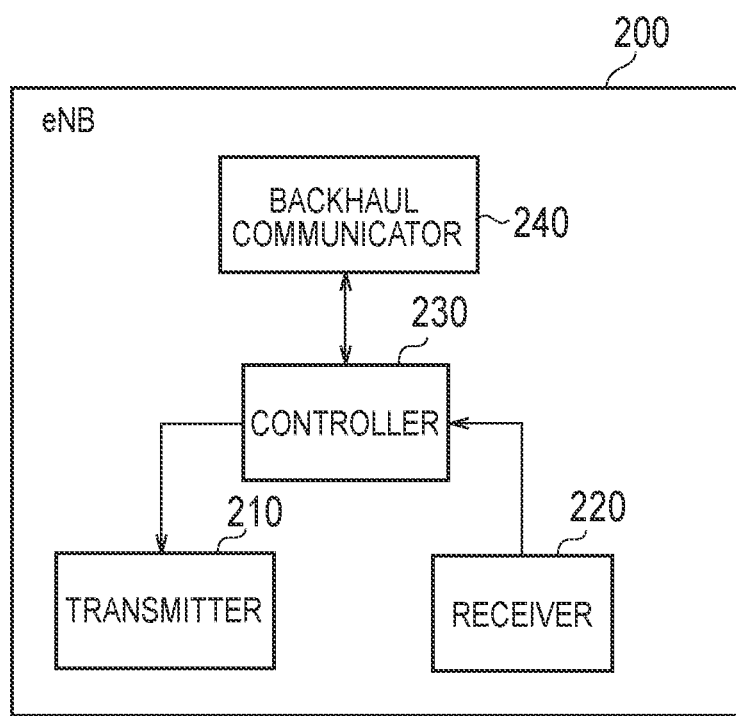
FIG. 3 is a diagram illustrating a configuration of an eNB (base station) according to the embodiment.

FIG. 3 is a diagram illustrating a configuration of the eNB 200 (base station). The eNB 200 includes a transmitter 210, a receiver 220, a controller 230, and a backhaul communicator 240.

The transmitter 210 performs a variety of transmission under the control of the controller 230. The transmitter 210 includes an antenna and a transmitting device. The transmitting device converts a baseband signal (transmitted signal) output from the controller 230 into a radio signal and transmits the radio signal from the antenna.

The receiver 220 performs a variety of reception under the control of the controller 230. The receiver 220 includes an antenna and a receiving device. The receiving device converts the radio signal received by the antenna into the baseband signal (received signal) and outputs the baseband signal to the controller 230.

The controller 230 performs various controls in the eNB 200. The controller 230 includes at least one processor and memory. The memory stores a program executed by the processor and information used for processing by the processor. The processor may include a baseband processor and a CPU. The baseband processor performs modulation/demodulation, encoding/decoding, and the like of the baseband signal. The CPU performs a variety of processing by executing programs stored in the memory. The processor executes processing to be described later.

The backhaul communicator 240 is connected to an adjacent eNB via an X2 interface. The backhaul communicator 240 is connected to an MME/S-GW 300 via an S1 interface. The backhaul communicator 240 is used for communication performed on the X2 interface, communication performed on the S1 interface, and the like.

Figure 4:
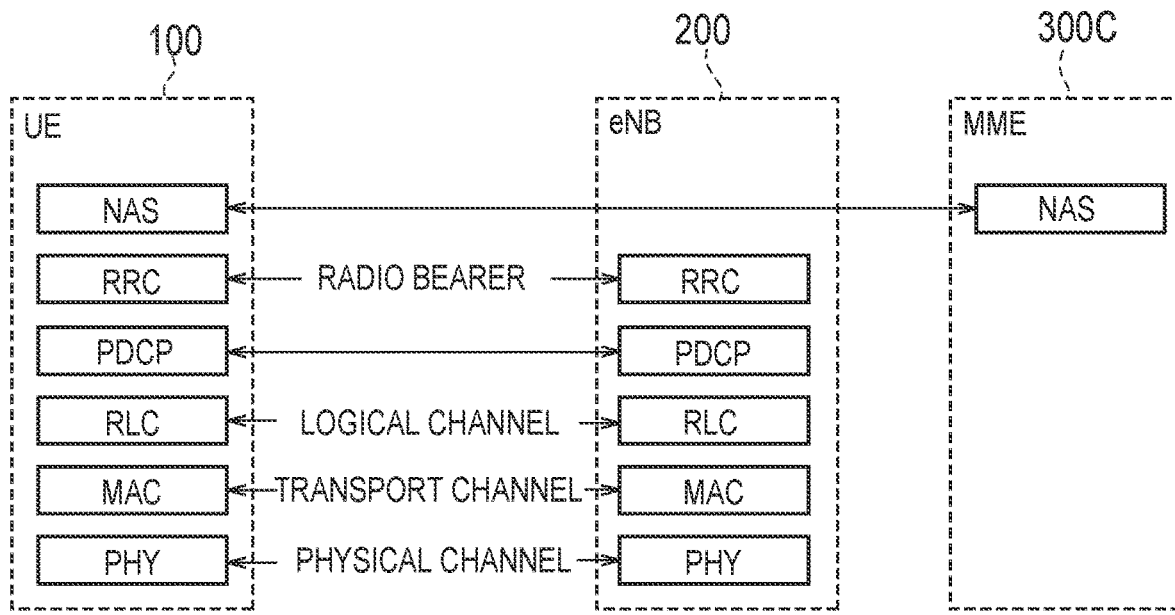
FIG. 4 is a diagram illustrating a protocol stack of a radio interface in the LTE system according to the embodiment.

FIG. 4 is a diagram illustrating a configuration of a protocol stack of a radio interface in the LTE system. As illustrated in FIG. 4, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs encoding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs priority control of data, retransmission processing by hybrid ARQ (HARQ), a random access procedure, and the like. The data and control information are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and encoding scheme (MCS)) and a resource block allocated to the UE 100.

The RLC layer transmits data to an RLC layer on a receiving side using the functions of the MAC layer and the PHY layer. The data and control information are transmitted between the RLC layer of the UE 100 and the RLC layer of the eNB 200 via a logical channel.

The PDCP layer performs header compression/expansion and encryption/decryption.

The RRC layer is defined only in a control plane that handles the control information. The RRC signaling for various configurations is transmitted between the RRC layer of the UE 100 and the RRC layer of the eNB 200. The RRC layer controls logical channels, transport channels, and physical channels in response to establishment, re-establishment, and release of a radio bearer. When there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

The NAS layer located above the RRC layer performs session management, mobility management, and the like. NAS signaling is transmitted between the NAS layer of the UE 100 and a NAS layer of MME 300C. The UE 100 has functions such as an application layer in addition to a radio interface protocol.

Figure 5:
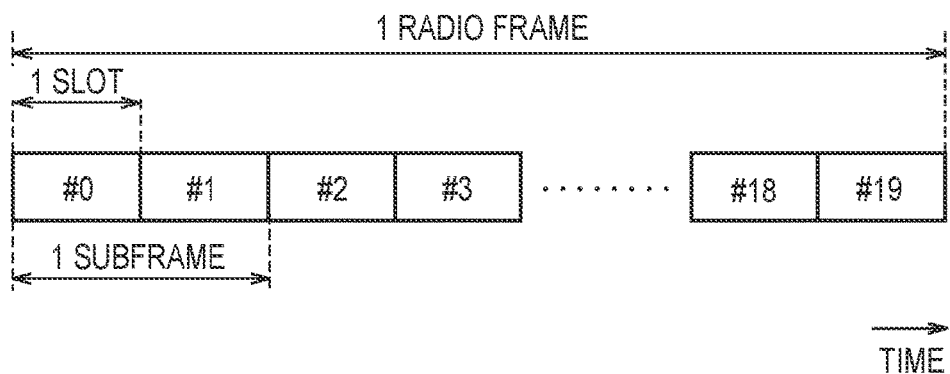
FIG. 5 is a diagram illustrating a configuration of a radio frame in the LTE system according to the embodiment.

FIG. 5 is a diagram illustrating a configuration of a radio frame used in the LTE system. The radio frame is composed of 10 subframes on a time base. Each subframe is composed of two slots on the time base. Lengths of each subframe are 1 ms. Lengths of each slot are 0.5 ms. Each subframe includes a plurality of resource blocks (RBs) in a frequency base. Each subframe includes a plurality of symbols on the time base. Each resource block includes a plurality of subcarriers on the frequency base. Specifically, one RB is composed of 12 subcarriers and one slot. One resource element (RE) is composed of one symbol and one subcarrier. Of the radio resources (time/frequency resources) allocated to the UE 100, a frequency resource can be specified by a resource block, and a time resource can be specified by a subframe (or slot).

In the downlink, a section of several head symbols of each subframe is an area which can be used as a physical downlink control channel (PDCCH) for mainly transmitting downlink control information. The remaining part of each subframe is an area which can be used as a physical downlink shared channel (PDSCH) for transmitting downlink data.

In the uplink, both end portions of each subframe in the frequency direction is an area which can be used as a physical uplink control channel (PUCCH) for mainly transmitting uplink control information. The remaining part of each subframe is an area which can be used as a physical uplink shared channel (PUSCH) for mainly transmitting uplink data.

(Overview of eMTC and NB-IoT)

An overview of eMTC and NB-IoT will be described. In the present embodiment, a scenario is assumed in which there is a UE 100 in a new category targeting the MTC and IoT services. The UE 100 in the new category is a UE 100 whose transmission/reception bandwidth is limited to only a part of a system transmission/reception bandwidth (LTE transmission/reception bandwidth). The UE in the new category is referred to as, for example, category M1 and category narrow band (NB)-IoT. The category M1 is a category to which an enhanced machine type communications (eMTC) UE belongs. The category NB-IoT (category NB1) is a category to which the NB-IoT UE belongs. The category M1 limits the transmission/reception bandwidth of the UE 100 (eMTC UE) to, for example, 1.08 MHz (that is, a bandwidth of 6 resource blocks). The category NB-IoT (category NB1) further limits the transmission/reception bandwidth of the UE 100 (NB-IoT UE) to 180 kHz (that is, a bandwidth of one resource block). By the narrowing of the bandwidth, it is possible to realize cost reduction and power consumption required for the eMTC UE and the NB-IoT UE.

Figure 6:
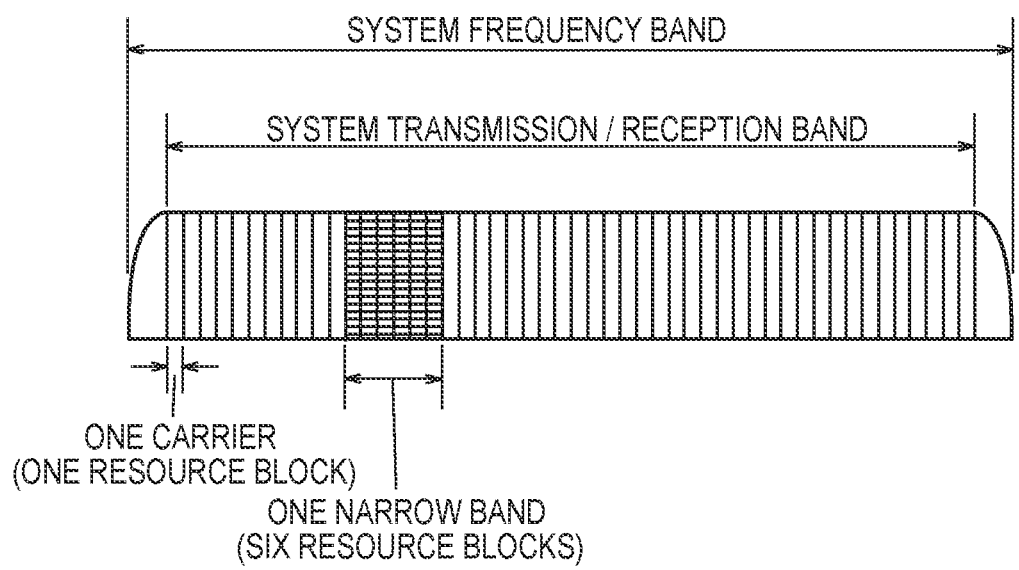
FIG. 6 is a diagram illustrating an example of a frequency channel handled by an eMTC UE and an NB-IoT UE.

FIG. 6 is a diagram illustrating a frequency channel handled by the eMTC UE and the NB-IoT UE. As illustrated in FIG. 6, a frequency bandwidth of a system frequency band of the LTE system may be 10 MHz. The bandwidth of the system transmission/reception bandwidth is, for example, 50 resource blocks=9 MHz. The bandwidth of the frequency channel that is available by the eMTC UE is within 6 resource blocks=1.08 MHz. The frequency channel within 6 resource blocks that is available by the eMTC UE is referred to as a "narrow band (NB)". The bandwidth of the frequency channel that is available by the NB-IoT UE is 1 resource block=180 kHz. The frequency channel of 1 resource block that is available by the NB-IoT UE is referred to as a "carrier".

The eMTC UE is operated within the LTE transmission/reception bandwidth. The NB-IoT UE supports a form operated within the LTE transmission/reception bandwidth, a form operated in a guard band outside the LTE transmission/reception bandwidth, and a form operated within the frequency band dedicated to the NB-IoT.

The eMTC UE and the NB-IoT UE support an enhanced coverage (EC) function using repeated transmission or the like in order to realize coverage extension. The enhanced coverage function may include repetition that repeatedly transmits the same signal using a plurality of subframes. The coverage can be extended as the number of times of repetitions increases. The enhanced coverage function may include power boosting that increases a power density of the transmitted signal. As an example, the power density increases by narrowband transmission that narrows the frequency bandwidth of the transmitted signal. The coverage can be extended as the power density of the transmitted signal increases. The enhanced coverage function may include lower MCS transmission that lowers the MCS used for the transmitted signal. The coverage can be extended by performing transmission using MCS with a low data rate and high error tolerance.

(Overview of Random Access Procedure)

Figure 7:
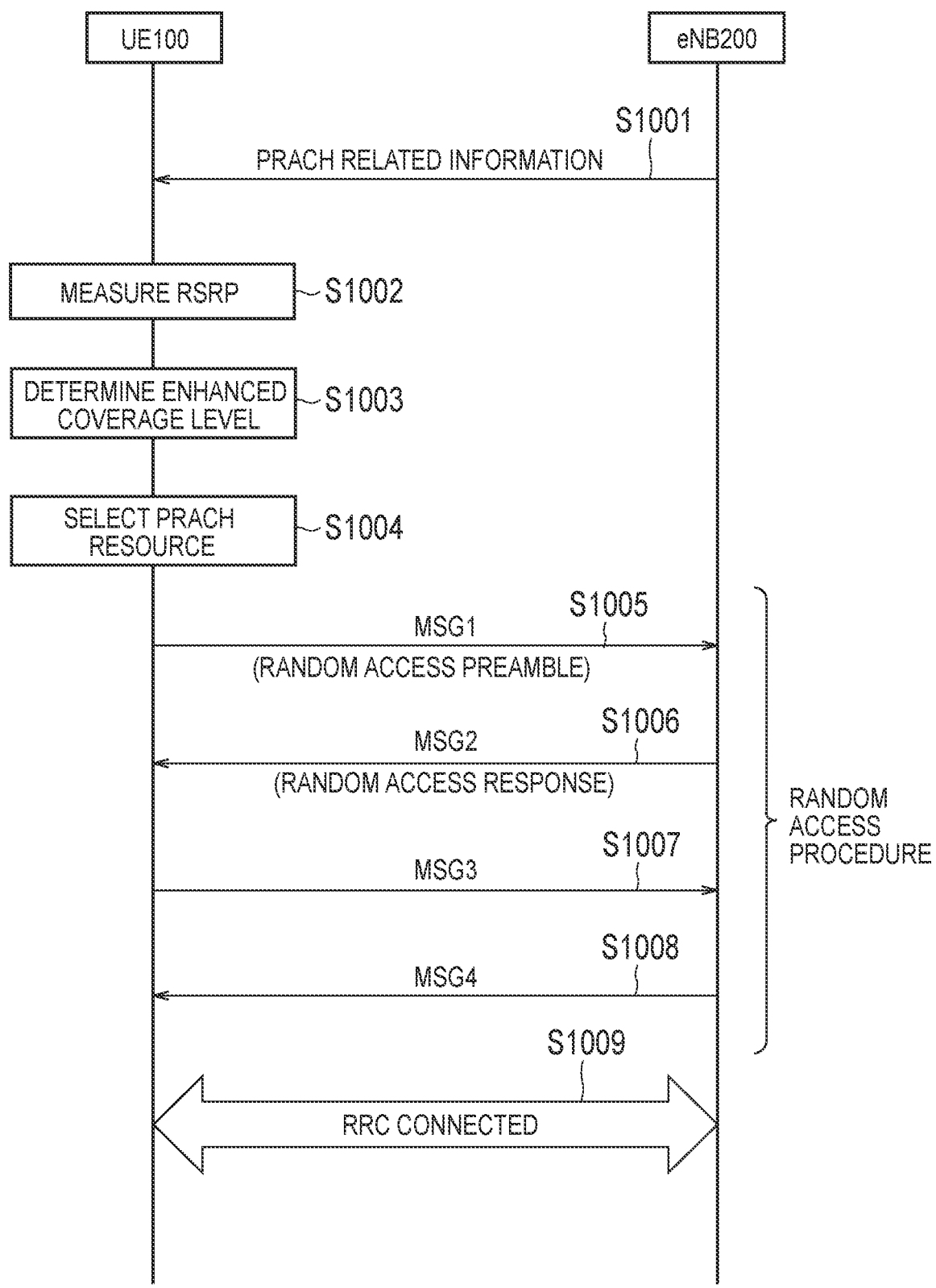
FIG. 7 is a diagram illustrating an example of a random access procedure for the eMTC UE and the NB-IoT UE.

FIG. 7 is a diagram illustrating the random access procedure for the eMTC UE and the NB-IoT UE. In an initial state, the UE 100 is in the RRC idle mode. The UE 100 executes the random access procedure in order to transition to the RRC connected mode. Such a case is referred to as an initial connection (Initial access from RRC_IDLE). At the time of the initial connection, a contention based random access procedure is applied.

The UE 100 selects a cell of the eNB 200 as a serving cell. If first cell selection criteria (first S-criteria) for normal coverage are not satisfied and second cell selection criteria (second S-criteria) for enhanced coverage are satisfied, the UE 100 may determine that the UE 100 is in the enhanced coverage. The "UE in the enhanced coverage" means a UE that is required to use an enhanced coverage function (enhanced coverage mode) in order to access a cell. Note that the eMTC UE is essential to use the enhanced coverage mode. Here, the description will be made under the assumption that the UE 100 is in the enhanced coverage.

In step S1001, the eNB 200 transmits physical random access channel (PRACH) related information by broadcast signaling (for example, SIB). The PRACH related information includes various parameters provided for each enhanced coverage level. As an example, for the enhanced coverage level, a total of four levels of enhanced coverage levels 0 to 3 are defined. Various parameters include a reference signal received power (RSRP) threshold, a PRACH resource, and the maximum number of times of preamble transmissions. The PRACH resource includes a radio resource (time/frequency resource) and a signal sequence (preamble sequence). The UE 100 stores the received PRACH related information.

In step S1002, the UE 100 measures the RSRP based on the reference signal transmitted from the eNB 200.

In step S1003, the UE 100 determines its own enhanced coverage level (CE level) by comparing the measured RSRP with the RSRP threshold for each enhanced coverage level. The enhanced coverage level indicates a degree of enhanced coverage required for the UE 100. The enhanced coverage level is related to at least the number of times of transmissions (that is, the number of times of repetitions) in the repetition.

In step S1004, the UE 100 selects the PRACH resource corresponding to its own enhanced coverage level.

Steps S1005 to S1008 constitute the random access procedure. In step S1005, the UE 100 transmits Msg1 (random access preamble) to the eNB 200 using the selected PRACH resource. Note that the "Msg" is an abbreviation for a message. The eNB 200 specifies the enhanced coverage level of the UE 100 based on the PRACH resource used for the received Msg1.

In step S1006, the eNB 200 transmits, to the UE 100, Msg2 (random access response) including scheduling information indicating a PUSCH resource allocated to the UE 100. The UE 100 can transmit the Msg1 plural times up to the maximum number of times of preamble transmissions corresponding to its own enhanced coverage level until the UE 100 normally receives the Msg2.

In step S1007, the UE 100 transmits Msg3 to eNB 200 based on the scheduling information. The Msg3 may be an RRC connection request message.

In step S1008, the eNB 200 transmits Msg4 to the UE 100. The Msg4 may be an RRC connection setup message.

In step S1009, the UE 100 transitions to the RRC connected mode in response to the reception of the Msg4. At this time, the UE 100 may transmit Msg5: RRC connection setup complete message to the eNB 200. Thereafter, the eNB 200 controls the repetition and the like to the UE 100 based on the specified enhanced coverage level.

(Operation Related to Early Data Transmission)

An eMTC UE and an NB-IoT UE transmit/receive a small amount of data and the frequency of the transmission/reception is low. In the present embodiment, an example of early data transmission in which the eMTC UE or the NB-IoT UE transmits/receives user data using a predetermined message during the random access procedure will be described.

The early data transmission includes uplink early data transmission for transmitting/receiving uplink data using Msg3 in the random access procedure, and downlink early data transmission for transmitting/receiving downlink data using Msg4 in the random access procedure.

Now, an operation example of basic early data transmission will be described.

First of all, the eNB 200 uses SIB to broadcast information indicating the maximum uplink data amount (maximum transport block size) that can be transmitted by the UE 100 with the uplink early data transmission. The UE 100 in the RRC idle mode receives this SIB and determines whether the uplink data amount to be transmitted from the UE 100 to the eNB 200 is equal to or less than the maximum uplink data amount. When the uplink data amount to be transmitted from the UE 100 to the eNB 200 is equal to or less than the maximum uplink data amount, the UE 100 determines to perform early data transmission and starts the random access procedure involving early data transmission.

Next, the UE 100 in the RRC idle mode transmits Msg1 (EDT indication) indicating the intention of the UE 100 to perform the early data transmission to the eNB 200. The eNB 200 transmits Msg2 including uplink allocation information to the UE 100 upon receiving Msg1.

Next, the UE 100 transmits Msg3 to the eNB 200 upon receiving Msg2. The UE 100 transmits uplink data to the eNB 200 when transmitting Msg3. The eNB 200 transmits Msg4 to the UE 100 in response to the reception of Msg3. When the transmission/reception of the uplink data and the downlink data is completed through the transmission/reception of Msg3 and Msg4, the UE 100 completes the random access procedure while maintaining the RRC idle mode. Such completion of the random access procedure while maintaining the RRC idle mode will be referred to as "normal completion of early data transmission".

There are two types of early data transmission: User Plane (UP) solution and Control Plane (CP) solution. With the UP solution, in the early data transmission, data (DTCH) and RRC message (CCCH) are multiplexed in one MAC PDU and transmitted in the MAC layer with no data included in the RRC message. On the other hand, with the CP solution, the early data transmission is performed with data included in the RRC message.

The UP solution is applied when the UE 100 is in the suspend state, which is a sub state of the RRC idle mode. The suspend state is a sub state of the RRC idle mode in which the context information of the UE 100 is maintained in the eNB 200. With the UP solution, the RRC message forming Msg3 is an RRC Connection Resume Request message, and the RRC message forming Msg4 is basically an RRC Connection Release message or an RRC Connection Reject message. Upon receiving the RRC Connection Release message, the UE 100 completes the random access procedure while maintaining the RRC idle mode (that is, normal completion of early data transmission). Still, the RRC message forming Msg4 may be the RRC Connection Resume message. Upon receiving the RRC Connection Resume message, the UE 100 transitions to an RRC connected mode and transmits/receives data in the RRC connected mode.

The CP solution is applied when the UE 100 is in the RRC idle mode but not in the suspend state. With the CP solution, the RRC message forming Msg3 is an Early Data Request message, and the RRC message forming Msg4 is basically an Early Data Complete message. Upon receiving the Early Data Complete message, the UE 100 completes the random access procedure while maintaining the RRC idle mode (that is, normal completion of early data transmission). Still, the RRC message forming Msg4 may be the RRC Connection Setup message. Upon receiving the RRC Connection Setup message, the UE 100 transitions to an RRC connected mode and transmits/receives data in the RRC connected mode.

(1) Cell Reselection Operation

A cell reselection operation in early data transmission according to the present embodiment will be described.

The cell reselection operation is an operation in which the UE 100 in the RRC idle mode reselects a cell different from the current serving cell as a new serving cell. In the cell reselection operation, the UE 100 selects an appropriate cell by comparing the quality (RSRP: Reference Signal Received Power) of the current serving cell and with the quality of adjacent cells.

In a typical random access procedure involving no early data transmission, the UE 100 in the RRC idle mode continuously performs the cell reselection operation during the random access procedure.

On the other hand, in the random access procedure involving the early data transmission, the UE 100 in the RRC idle mode stops the cell reselection operation to complete the data transmission/reception. That is, the UE 100 in the RRC idle mode stops the cell reselection operation when the early data transmission is performed. For example, the UE 100 stops the cell reselection operation when transmitting a random access preamble (Msg1) to the current serving cell, when receiving a random access response (Msg2) from the current serving cell, or when transmitting an RRC message (Msg3) to the current serving cell. Note that stopping the cell reselection operation may mean stopping (not performing) the process of comparing the quality of the current serving cell with the quality of the adjacent cell while enabling the measurement for these cells. Stopping the cell reselection operation may mean stopping (not performing) measurement for an adjacent cell while enabling measurement for the current serving cell.

However, when the early data transmission is completed normally, the UE 100 maintains the RRC idle mode. Thus, in the present embodiment, the UE 100 resumes the cell reselection operation in response to the normal completion of the early data transmission. Specifically, the UE 100 resumes the cell reselection operation upon receiving the RRC message (Msg4) for normally completing the early data transmission from the current serving cell. Such an RRC message (Msg4) is the RRC Connection Release message, the RRC Connection Reject message, or the Early Data Complete message. This enables the UE 100 to reselect a cell different from the current serving cell as a new serving cell after the early data transmission has been normally completed. Note that resumption of the cell reselection operation means resuming at least a part of the processing that has been stopped.

The UE 100 may continue checking whether the current serving cell satisfies a predetermined quality condition while the cell reselection operation is being stopped for the early data transmission. Specifically, the UE 100 continues to check whether the RSRP of the current serving cell satisfies the cell selection criterion (the above-described first S-criteria or second S-criteria). Then, the UE 100 may resume the cell reselection operation upon confirming that the current serving cell does not satisfy the predetermined quality condition.

Figure 8:
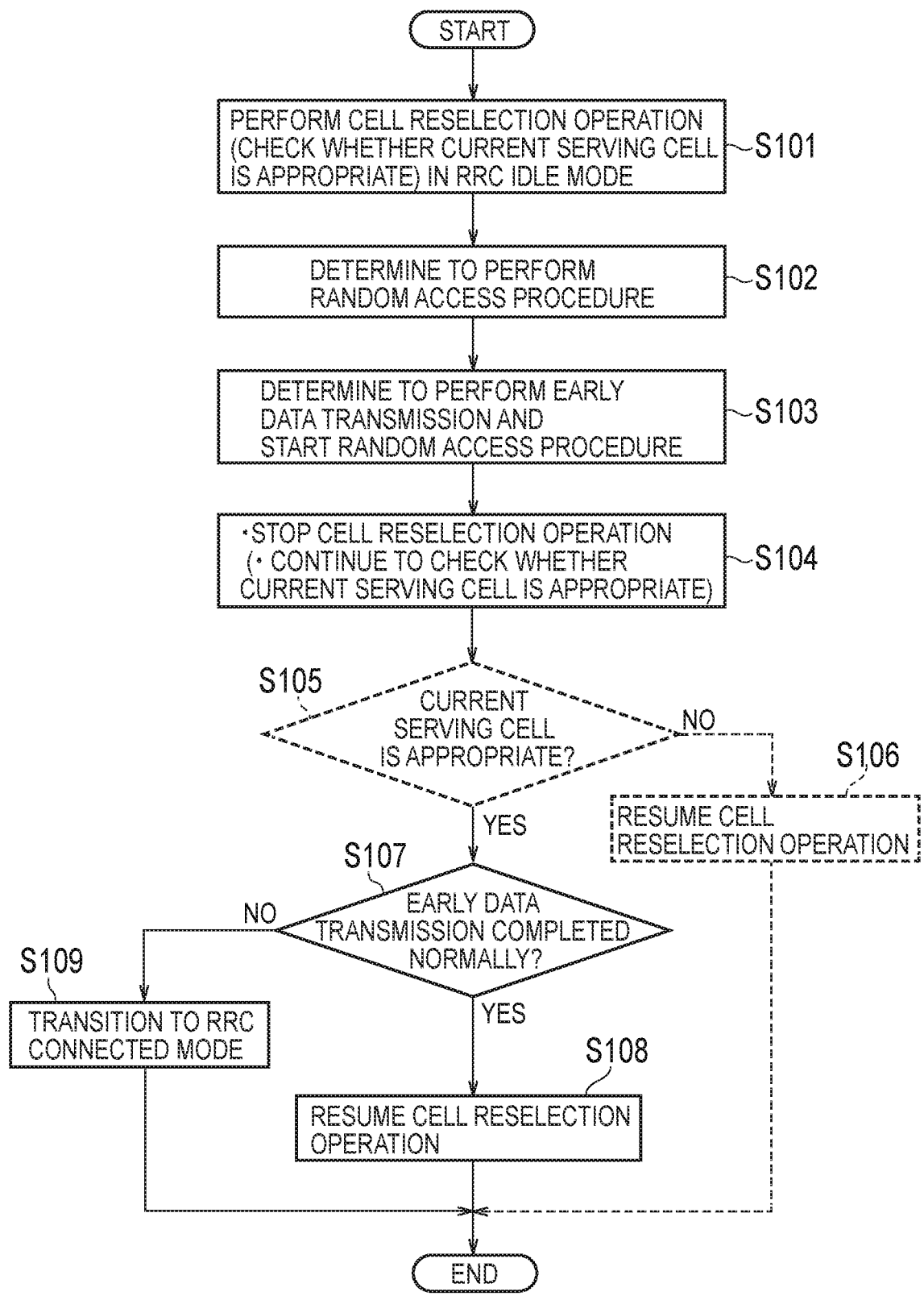
FIG. 8 is a diagram illustrating an example of a cell reselection operation regarding early data transmission according to an embodiment.

FIG. 8 is a diagram illustrating an example of a cell reselection operation regarding early data transmission according to the present embodiment. In FIG. 8, non-essential processes are illustrated with parentheses and broken lines.

As illustrated in FIG. 8, in step S101, the UE 100 in the RRC idle mode checks whether the RSRP of the current serving cell satisfies the cell selection criterion, and performs the cell reselection operation.

In step S102, the UE 100 determines to perform the random access procedure. For example, the UE 100 determines to perform the random access procedure when there is uplink data to be transmitted from the UE 100, when the UE 100 receives a paging message, or the like.

In step S103, the UE 100 determines to perform early data transmission. For example, the UE 100 determines to perform the early data transmission and starts the random access procedure involving the early data transmission, when the uplink data amount (transport block size) to be transmitted from the UE 100 to the eNB 200 is equal to or smaller than the maximum uplink data amount (the maximum transport block size) configured by the eNB 200.

In step S104, the UE 100 stops the cell reselection operation when transmitting a random access preamble (Msg1) to the current serving cell (eNB 200), when receiving a random access response (Msg2) from the current serving cell, or when transmitting an RRC message (Msg3) to the current serving cell. However, the UE 100 may continue to check whether the RSRP of the current serving cell satisfies the cell selection criterion.

In step S105, the UE 100 checks whether the RSRP of the current serving cell satisfies the cell selection criterion, that is, whether the current serving cell is appropriate. When the current serving cell is inappropriate (step S105: NO), the UE 100 resumes the cell reselection operation in step S106.

On the other hand, when the current serving cell is appropriate (step S105: YES), the UE 100 determines in step S107 whether the early data transmission is normally completed. For example, the UE 100 determines whether a message indicating that the eNB 200 has normally received the early data or a message not triggering the transition to the RRC connection mode (specifically, the RRC Connection Release message, the RRC Connection Reject message, the Early Data Complete message, or the like), as the RRC message (Msg4) from the eNB 200.

When it is determined that the early data transmission has been normally completed, that is, when the UE 100 has received the message indicating that the eNB 200 has normally received the early data or a message not triggering the transition to the RRC connection mode (specifically, the RRC Connection Release message, the RRC Connection Reject message, the Early Data Complete message, or the like) (step S107: YES), the UE 100 resumes the cell reselection operation while maintaining the RRC idle mode in step S108.

On the other hand, when it is not determined that the early data transmission has been normally completed, for example, when the UE 100 has received a message indicating that the eNB 200 did not normally receive the early data, a message triggering the transition to the RRC connection mode, or a message (specifically, the RRC Connection Resume message, the RRC Connection Setup message, or the like) other than the messages described above (such as the RRC Connection Release message) (step S107: NO), the UE 100 transitions to the RRC connected mode in step S109.

(2) Operation Related to Timer for RRC Idle Mode

An operation related to a timer for the RRC idle mode according to the present embodiment will be described.

The UE 100 in the RRC idle mode starts an operation of the timer related to the operation of the UE 100 in the RRC idle mode.

In the case of a general random access procedure not involving the early data transmission, the UE 100 transitions to the RRC connected mode and stops the timer for the RRC idle mode, upon receiving a normal message (the RRC Connection Resume message or the RRC Connection Setup message) as Msg4.

On the other hand, in the case of a random access procedure involving early data transmission, the UE 100 maintains the RRC idle mode when receiving a normal message (RRC Connection Release message, RRC Connection Reject message, or Early Data Complete message) as Msg4. Thus, in such a case, an unexpected error may occur, if all the timers for the RRC idle mode are stopped in response to the reception of Msg4, as in a general random access procedure not involving the early data transmission.

In the present embodiment, the UE 100 in the RRC idle mode receives the RRC message (Msg4) for normally completing the random access procedure from the eNB 200 after starting the random access procedure. When the RRC message is a message for early data transmission (the RRC Connection Release message, the RRC Connection Reject message, or the Early Data Complete message), the UE 100 maintains the operation of the timer in response to the reception of the RRC message. Thus, an error occurring when the timer is stopped can be prevented. The timer is a part of a plurality of timers to be stopped in response to the reception of the RRC message (Msg4), when the RRC message (Msg4) is not a message for early data transmission.

In the case of a random access procedure involving early data transmission, the UE 100 maintains the operation of the timer for the RRC idle mode illustrated in Table 1, when receiving a normal message (RRC Connection Release message, RRC Connection Reject message, or Early Data Complete message) as Msg4. It should be noted that the timer for the RRC idle mode illustrated in Table 1 is an example, and the UE 100 may maintain the operation of a timer other than the timer for the RRC idle mode illustrated in Table 1, in response to the normal message as Msg4. Furthermore, the UE 100 may maintain the operation of some of the timers for the RRC idle mode illustrated in Table 1 and stop the operation of the other timers in response to the reception of the normal message as Msg4.

TABLE 1

| Timer Name | Description |
| --- | --- |
| T302 | Timer for barring Mobile terminating access |
| T303 | Timer for barring Mobile originating call |
| T305 | Timer for barring Mobile originating signaling |
| T306 | Timer for barring Mobile originating CS fallback |
| T308 | Timer for ACDC |
| T350 | Timer for WLAN interworking |
| T360 | Timer for MCLD |

On the other hand, in the case of the random access procedure involving early data transmission, the UE 100 stops the timer for the RRC idle mode illustrated in Table 2, when receiving a normal message (RRC Connection Release message, RRC Connection Reject message, or Early Data Complete message) as Msg4. It should be noted that the timer for the RRC idle mode shown in Table 2 is an example, and the UE 100 may stop the operation of a timer other than the timer for the RRC idle mode illustrated in Table 2, in response to the normal message as Msg4. Furthermore, the UE 100 may stop the operation of some of the timers for the RRC idle mode illustrated in Table 2 and maintain the operation of the other timers in response to the reception of the normal message as Msg4.

TABLE 2

| Timer Name | Description |
| --- | --- |
| T300 | Maximum Waiting Time between Msg3 and Msg4 |
| T320 | Holding Time of cell reselection priority |
| T322 | Holding Time of redirectedCarrierOffsetDedicated |

For details of the timers illustrated in Tables 1 and 2, refer to 3GPP technical specification TS36.331, for example.

In Table 2, T300 is a timer counting of which is performed until the Msg4 reception, and thus is stopped in response to Msg4 reception. Furthermore, T320 and T322 are timers that determine the holding time of the parameters for cell selection explicitly given at the time of RRC Connection Release. Thus, these timers are temporarily stopped in response to the reception of Msg4, and are reconfigured (restarted) when these parameters have been notified using this Msg4.

FIG. 9 is a diagram illustrating an example of an operation regarding the timer for the RRC idle mode according to the present embodiment. Detailed description of the same processing as in FIG. 8 will be omitted.

As illustrated in FIG. 9, in step S201, the UE 100 in the RRC idle mode operates the timer for the RRC idle mode.

In step S202, the UE 100 determines to perform the random access procedure.

In step S203, the UE 100 determines to perform early data transmission and starts a random access procedure involving early data transmission.

In step S204, the UE 100 determines whether the early data transmission has been normally completed.

When it is determined that the early data transmission has been normally completed, that is, when the UE 100 receives a normal message as Msg4 (the RRC Connection Release message, the RRC Connection Reject message, or the Early Data Complete message) (step S204: YES), in step S205, the UE 100 maintains the RRC idle mode and maintains the operation of the timers illustrated in Table 1 among the operating timers, and stops the timers illustrated in Table 2.

On the other hand, if it is not determined that the early data transmission has been completed normally, for example, if the UE 100 receives the RRC Connection Resume message or the RRC Connection Setup message (step S204: NO), in step S206, the UE 100 transitions to the RRC connected mode, and stops the timers illustrated in Table 1 and the timers illustrated in Table 2.

(3) Operation Related to Early Contention Resolution Capability of NB-IoT UE

An operation regarding an early contention resolution capability of an NB-IoT UE according to the present embodiment will be described.

UEs other than NB-IoT UEs have the early contention resolution capability. The early contention resolution capability is a capability of receiving the RRC message and the MAC control element forming Msg4 in the random access procedure from the eNB 200 at different timings (that is, with different MAC PDUs). Specifically, the UE 100 having the early contention resolution capability first receives the MAC control element forming Msg4 (specifically, a UE Contention Resolution Identity MAC control element), and then can receive the RRC message forming the Msg4.

When uplink early data transmission is performed using Msg3 and when downlink early data transmission is performed using Msg4, the eNB 200 cannot transmit Msg4 to the UE 100 until the downlink data is received from the core network side. As a result, a contention resolution timer managed by the UE 100 in the MAC layer may expire, causing the UE 100 to determine that the random access procedure has failed. However, with the early contention resolution, the eNB 200 can transmit the MAC control element (UE Contention Resolution Identity MAC control element) forming Msg4 to the UE 100, before the downlink data is received from the core network side. Thus, the contention resolution timer can be prevented from expiring.

Thus, the early contention resolution capability should be a required capability of the UE 100 that can perform the early data transmission. In other words, only the UE 100 having the early contention resolution capability should be able to perform the early data transmission. Under such a condition, the eNB 200 can regard the UE 100 showing an intention to perform early data transmission using Msg1, has the early contention resolution capability, and apply the early contention resolution to the UE 100.

FIG. 10 is a diagram illustrating an example of an operation regarding the early contention resolution capability of the NB-IoT UE according to the present embodiment. The description will be given assuming that the UE 100 belongs to the NB-IoT category.

As illustrated in FIG. 10, in step S301, the UE 100 in the RRC idle mode determines to perform the random access procedure.

In step S302, the UE 100 determines whether the UE 100 has the early contention resolution capability.

When the UE 100 has the early contention resolution capability (step S302: YES), the UE 100 determines in step S303 that the UE 100 is capable of performing early data transmission.

On the other hand, when the UE 100 does not have the early contention resolution capability (step S302: NO), the UE 100 determines that the UE 100 is incapable of performing the early data transmission in step S304.

Other Embodiments

In the above-described embodiment, an example using the radio terminal (eMTC UE and NB-IoT UE) targeting the MTC or the IoT has been described. However, the present disclosure is not limited to the eMTC UE and the NB-IoT UE. The operation according to the embodiments described above may be applied to the general UE.

In the above-described embodiment, the RRC idle mode, the suspend mode, and the connected mode are mainly described as examples, but the present embodiment is not limited thereto.

The present embodiment may be applied to RRC light connection or INACTIVE state. The RRC light connection is one state of the RRC connected mode, and is a special state to which a part of the procedure of the RRC idle mode is applied. The INACTIVE is assumed to be introduced in the fifth generation mobile communication system, and is the RRC state different from the RRC connected mode and the RRC idle mode. The "RRC idle mode" in the above-described embodiment may be read as "INACTIVE mode".

In the above-described embodiment, the UE in the enhanced coverage has been described as an example, but the present embodiment is not limited thereto. The operation according to the embodiments described above may be applied to the UE in the normal coverage. Specifically, it is not necessary to perform the CE level determination based on the RSRP measurement in the RACH procedure.

In the above-described embodiment, the LTE system is exemplified as the mobile communication system. However, the present disclosure is not limited to the LTE system. The operation according to the above-described embodiment may be applied to the mobile communication systems (for example, 5th generation mobile communication system) other than the LTE system.

A program for causing a computer to execute each processing performed by the UE 100 and the eNB 200 may be provided. In addition, the program may be recorded on a computer-readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing performed by the UE 100 and the eNB 200 and a processor that executes the program stored in the memory may be provided.

The invention claimed is:

1. A method used in a user equipment configured to perform early data transmission in which uplink data is transmitted during random access procedure, the method comprising:
   starting a timer that determines a holding time of parameters used for cell reselection operation;
   receiving a Radio Resource Control (RRC) message used to confirm successful completion of the random access procedure, after the random access procedure has started; and
   in response to the received RRC message being a message used for the early data transmission, maintaining the operation of the timer in response to the reception of the RRC message, wherein
   the timer is one of a plurality of timers to be stopped in response to the reception of a RRC message that is not a message for early data transmission.

2. A user equipment configured to perform early data transmission in which uplink data is transmitted during random access procedure, the user equipment comprising:
   a processor and a memory, the processor configured to:
   start a timer that determines a holding time of parameters used for cell reselection operation;
   receive a Radio Resource Control (RRC) message used to confirm successful completion of the random access procedure, after the random access procedure has started; and
   in response to the received RRC message being a message used for the early data transmission, maintaining the operation of the timer in response to the reception of the RRC message, wherein
   the timer is one of a plurality of timers to be stopped in response to the reception of a RRC message that is not a message for early data transmission.

3. An apparatus used for controlling a user equipment configured to perform early data transmission in which uplink data is transmitted during random access procedure, the apparatus comprising:
   a processor and a memory, the processor configured to:
   start a timer that determines a holding time of parameters used for cell reselection operation;
   receive a Radio Resource Control (RRC) message used to confirm successful completion of the random access procedure, after the random access procedure has started; and
   in response to the received RRC message being a message used for the early data transmission, maintain the operation of the timer in response to the reception of the RRC message, wherein
   the timer is one of a plurality of timers to be stopped in response to the reception of a RRC message that is not a message for early data transmission.

* * * * *